(12) United States Patent
Muste

(10) Patent No.: US 12,529,586 B2
(45) Date of Patent: Jan. 20, 2026

(54) MEASUREMENT OF SYSTEM FOR STREAMFLOW DETERMINATION IN REAL TIME

(71) Applicant: University of Iowa Research Foundation, Iowa City, IA (US)

(72) Inventor: Marian Muste, Iowa City, IA (US)

(73) Assignee: UNIVERSITY OF IOWA RESEARCH FOUNDATION, Iowa City, IA (US)

(*) Notice: Subject to any disclaimer, the term of this patent is extended or adjusted under 35 U.S.C. 154(b) by 392 days.

(21) Appl. No.: 18/313,598

(22) Filed: May 8, 2023

(65) Prior Publication Data

US 2023/0366711 A1    Nov. 16, 2023

Related U.S. Application Data

(60) Provisional application No. 63/341,283, filed on May 12, 2022.

(51) Int. Cl.
*G01F 1/712*    (2006.01)
*G01F 1/002*    (2022.01)
*G01F 1/663*    (2022.01)

(52) U.S. Cl.
CPC .............. *G01F 1/712* (2013.01); *G01F 1/002* (2013.01); *G01F 1/663* (2013.01)

(58) Field of Classification Search
CPC ........... G01F 1/712; G01F 1/002; G01F 1/663
USPC ...................................................... 73/861.06
See application file for complete search history.

(56) References Cited

U.S. PATENT DOCUMENTS

2009/0195437 A1* 8/2009 Barrick ................. G01S 15/584
                                                      342/113
2018/0373993 A1* 12/2018 Petty ....................... G06F 30/20

OTHER PUBLICATIONS

"Evaluation of the Slope-Area Method for Continuous Streamflow Monitoring", E-proceedings of the 38th JAHR World Congress (provided by Applicant) (Year: 2019).*

Altinakar, M. S., Matheu, E. E., & McGrath, M. Z. (Sep. 27-Oct. 1, 20009). New generation modeling and decision support tools for studying impacts of dam failures [Paper presentation]. Proc., Association of State Dam Safety Officials Dam Safety 2009 Annual Conf.

De Sutter R., Verhoeven R. and Krein, A (2001) Simulation du transport de sédiment pendant des événements de crue: Expériences au laboratoire et sur le terrain. Hydrological Sciences Journal, 46(4):599-610.

(Continued)

*Primary Examiner* — Nathaniel T Woodward
(74) *Attorney, Agent, or Firm* — Goodhue, Coleman & Owens, P.C.

(57) ABSTRACT

A method for estimating stream flow data of a channel includes steps of acquiring direct measurement of an index velocity of the channel, acquiring stage measurements for the channel for use in determining slope of a free surface, and applying a data-driven model combining the index velocity and a continuous slope-area method which uses the slope of the free surface to estimate stream flow data of the channel without using conventional rating curves. The direct measurement of the index velocity and the stage measurements may be received at a computing device executing instructions for applying the data-driven model.

20 Claims, 13 Drawing Sheets

(56) References Cited

OTHER PUBLICATIONS

Di Baldassarre, G. and Montanari, A. (2009). Uncertainty in river discharge observations: a quantitative analysis, Hydrol. Earth Syst. Sci. Discuss., 6, pp. 39-61.

Dottori, F. and Todini, E. (2010). Reply to Comment on A dynamic rating curve approach to indirect discharge measurement by Dottori et al (2009) by Koussis (2009), Hydrol. Earth Syst. Sci. 14, pp. 1099-1107, doi:10.5194/hess-14-1099-2010.

Dottori, F., Martina, L.V. and Todini, E. (2009). A dynamic rating curve approach to indirect discharge measurements, Hydrol. Earth Syst. Sci, 13, pp. 847-863.

Fenton, J. D. (2018), On the generation of stream rating curves, Journal of Hydrology 564, 748-757.

Jain, S. and Lall, U. (2000). Magnitude and timing of annual maximum floods: trends and large-scale climatic associations for the Blacksmith Fork River, Utah, Water Resources Research, 36(12).

Khan, M.R., Gourley, J.J., Duarte, J.A., Vergara, A., Wasielewski, D., Ayral, P-A. and Fulton, J.W. (2021). Uncertainty in remote sensing of streams using noncontact radars, Journal of Hydrology, 603 (Part A), https://doi.org/10.1016/j.jhydrol.2021.126809.

Le Coz J., Pierrefeu, G., and Paquier, A. (2008) Evaluation of river discharges monitored by a fixed side-looking Doppler profiler. Water Resources Research, 46(4)https://doi.org/10.1029/2008WR006967.

Mrokowska MM, Rowinski PM (2019) Impact of unsteady flow events on bedload transport: A review of laboratory experiments. Water (Switzerland), 11(5):907. https://doi.org/10.3390/w11050907.

Muste, M. and Kim, D. (2020). Augmenting the operational capabilities of SonTek/YSI streamflow measurement probes, Sontek/YSI-IIHR Collaborative Research Report, Iowa City, IA (available at: https://info.xylem.com/rs/240-UTB-146/images/augmenting-capabilities-sontek-probe.pdf).

Muste, M., Bacotiu, C. and Thomas, D. (2019). Evaluation of the slope-area method for continuous streamflow monitoring, Proceedings IAHR World Congress, Sep. 1-6, 2019, Panama City, Panama.

Muste, M., Kim, D. and Kim, K. (2022). A flood-crest forecast prototype for river floods using only in-stream measurements, Communications Earth & Environment (accepted).

Oberg, K. and Mueller, D.S. (2007). Validation of streamflow measurements made with Acoustic Doppler Current Profilers, J. Hydraul. Eng.—ASCE, 133(12), pp. 1421-1432.

Aricó, C., Tucciarelli, T., Dottori, F., Martina, M.L.V. and Todini, E. (2008). Discharge and peak flow estimation using pairs of simultaneous water level measurements, Proceedings River Flow Conference, Altinakar, et al. (eds), ISBN 978-605-60136-3-8, 2423-2429.

Chen YC, Yang TM, Hsu NS, Kuo TM (2012) Real-time discharge measurement in tidal streams by an index velocity. Environmental Monitoring and Assessment, 184(10):6423-6436. https://doi.org/10.1007/s10661-011-2430-y.

Chow, V. T. (1959). Open channel flow. London: McGraw-Hill, 11(95), 99, 136-140.

Ferrick, M.G. (1985). Analysis of river wave types, Water Resources Research, 21(2), 209-220.

Graf, W.H. and Qu, Z. (2004). Flood hydrographs in open channels, Proceedings of the Institute of Civil Engineers Water Management (157), pp. 45-52.

Knight, D.W. (2006). River flood hydraulics: calibration issues in one-dimensional flood routing models. In: Knight & Shamseldin (eds), Ch 18, River basin modelling for flood risk mitigation, Taylor & Francis, Chichester, 335-385.

Prowse, C.W. (1984). Some thoughts on lag and hysteresis, Royal Geographical Society, 16(1), 17-23.

Rijn LC van (1986) Mathematical Modeling of Suspended Sediment in Nonuniform Flows. Journal of Hydraulic Engineering, 112(6):433-455.

Yen, B. C. and Gonzalez-Castro, J. A., (2000). Open-channel capacity determination using hydraulic performance graph. J. Hydraul. Eng. 126 (2), 112-122.

\* cited by examiner

MEASUREMENT OF SYSTEM FOR STREAMFLOW DETERMINATION IN REAL TIME

PRIORITY STATEMENT

This application claims priority to U.S. Provisional Patent Application No. 63/341,283, entitled "Measurement of System for Streamflow Determination in Real Time" and filed May 12, 2022, hereby incorporated by reference in its entirety.

FIELD OF THE INVENTION

The present invention relates to monitoring streamflow. More particularly, but not exclusively, the present invention relates to methods and systems for measurement of stream flow.

BACKGROUND

Monitoring and forecasting streamflow are at the core of the decision making for critical socio-economic areas. These data are also used as benchmarks for scientific studies on water cycle, ecological patterns, and climate trends. Given their importance, complexity, and costs, streamflow measurements are acquired by specialized agencies using protocols that were continuously revised through century-long incremental developments (USGS, 1994). Most of these developments have considered river flows as quasi-stationary, i.e., fluctuating within an unchanging envelope of variability (Jain & Lall, 2000). This assumption coupled with limitations of the past monitoring technologies have given rise to empirical- or semi-empirical streamflow monitoring protocols based on ratings established with statistical analyses applied to long records of historical data under the assumption that flows are quasi-steady at any time. The most-often used relationship for monitoring streamflows is the stage-discharge rating (WMO, 2010). Since 1980s, an emerging alternative approach is the index-velocity method that is recommended for measurements in unsteady flows and in areas affected by backwater (Levesque & Oberg, 2012). Both methods combine direct measurements of flow variables (stage for stage-discharge method and stage and index-velocity for index-velocity method, respectively) acquired in one cross section in conjunction with pre-established one-to-one ratings that are uniformly applied for steady and unsteady flows.

It is, however, well documented theoretically that the mechanisms of the flow during the rising and falling stages of the flood wave propagation are different from those of steady flows (Graf &Qu, 2004). Consequently, the discharge ratings during flood wave propagation are inherently multi-valued (a.k.a. looped) pending of the interplay between the flow depth (a geometric descriptor of the flow) and the changes in flow velocity, water-surface slope, cross-sectional area along the channel, and of the flow variables in time (Schmidt, 2002; Henderson, 1966). The looped discharge ratings are in fact manifestation of the hysteresis in the flow mechanisms. Hysteresis, also encountered in other engineering areas, is the property of a process whereby the state of a system at a given time depends on the direction of the change to reach that state (e.g., Prowse, 1984). While the terms loop and hysteresis are acknowledged in monitoring practice, they are only taken into consideration at few stage-discharge stations located in flood-prone area where streamflow forecasts are issued (Holmes, 2016). For those sites, corrections are applied to the streamflow estimates after the data is collected using empirical (Schmidt & Garcia, 2003) or analytical (Fenton, 2018; Di Baldassare & Montanan, 2009; Fenton & Keller, 2001) adjustments applied to the "steady" ratings. The majority of the stage-discharge ratings are used without corrections despite that Holmes (2016) found that hysteresis affects more than 65% of the US stage-discharge stations. The index-velocity method is used without corrections as it deemed that it is in better suited for unsteady flows (Morlock et al, 2002). A new promising method that can measure unsteady flow is the Continuous Slope-Area (CSA) that has been recently tested by the inventor (Muste et al., 2019). This method was originally developed for extending the stage-discharge rating in areas of high flows using high water marks left on the ground after flood recess.

To the best of the present inventor's knowledge, currently there are no systematic studies for uniformly assessing the hysteresis impacts on the streamflow estimates nor for validating the methods used to correct the performance of the ratings during unsteady flows. Accomplishing these overlooked tasks is hindered in the first place by the lack of a widely-recognized method to directly measure streamflows. Besides this impediment, there are other reasons invoked for this status quo, that are argued in the Muste & Kim (2020) paper with experimental evidence. First, there is a perception in the hydrometric community that the transitory processes cannot be distinguished from instrument uncertainty (Holmes, 2016). This perception is in contrast with the few available field observations, where considerable differences between measured and actual streamflow data are found for both cyclical processes, i.e., up to 40% due to time-dependent flood wave dynamics (Muste & Kim, 2020; Dottori et al., 2009; Fenton & Keller, 2001). These differences considerably exceed the 5% threshold widely accepted for uncertainty in measurements (Oberg & Mueller, 2007). The second reason, and the most often invoked, is related to the limited capabilities to continuously capture these processes in natural streams. While such a reasoning could have been justified in the past, the substantial advancements produced by the adoption of non-intrusive technologies (e.g., acoustic-, radar-, ultrasound-, and image-based), new deployment technologies (remote- and close-range sensing), and data communication means (cellular networks) in the last four decades have dramatically transformed our in-situ measurement capabilities.

To date, the available instruments enable acquiring data in natural streams with spatio-temporal resolution on par with those obtained in laboratory conditions (Muste et al., 2012). This progress in instrumentation has not been mirrored by similar advancements in streamflow measurement protocols. Specifically, the monitoring protocols continue to apply statistical analysis to the quasi-randomly and discreetly acquired data rather than exploring more physical-based measurement approaches that take advantage of the capabilities of the new generation of instruments. A notable feature of the new generation of instruments is their non-intrusive nature which reduces the installation and operational costs. As a result, there is a need to identify monitoring approaches capable of accurately tracking flow variables in real time in steady and unsteady flows. Moreover, at a time when the floods are increasing in magnitude, intensity, and frequency worldwide there is pressing need to capture and thoroughly understand the dependencies among flow

SUMMARY

Therefore, it is a primary object, feature, or advantage of the present invention to improve over the state of the art.

It is a further object, feature, or advantage of the present invention to provide methods and systems which combine index-velocity and slope-area methods.

It is a still further object, feature, or advantage of the present invention to methods and system with a reach-scale approach.

Another object, feature, or advantage is to provide a method and system which allows for capturing simultaneously changes of flow velocity, free-surface slope, and stage over the full duration of flood wave propagation.

Yet another object, feature, or advantage is to provide a data science approach for real time discharge estimate that enables hydrologists to estimate streamflow data more efficiently by removing the expensive process of developing rating curves.

A further object, feature, advantage is to provide for short-term forecasting capabilities using only direct stream measurements.

A still further object, feature, or advantage is to provide methods and systems for application to any type of flow regime propagating through the channels including steady and uniform flow or unsteady non-uniform flow.

Another object, feature, or advantage to advance modern practices in hydrometry.

Yet another object, feature, or advantage is to enable improved streamflow data accuracy and to usefully support model- and data-driven predictions.

A further object, feature, or advance is to capture and thoroughly understand the dependencies among flow variables during flood wave propagation cycles using real-time measurements acquired in-situ.

One or more of these and/or other objects, features, or advantages of the present invention will become apparent from the specification and claims that follow. No single embodiment need provides each and every object, feature, or advantage. Different embodiments may have different objects, features, or advantages. Therefore, the present invention is not to be limited to or by any objects, features, or advantages stated herein.

According to one aspect, the present disclosure provides a new measurement system for estimation of the streamflow variation (pulses) in real time through assimilation of direct measurements in canonical channel flow governing relationships, such as Saint-Venant equations for unsteady open-channels flows. These measurements are now increasingly possible by taking advantage of the capabilities of the new generation of instruments to acquire unassisted multiple flow variables with high-temporal resolution at monitoring sites experiencing propagation of flood wave. The measurement system innovatively combines the proven capabilities of the index-velocity and continuous slope-area methods to document the complex and often-missed hysteresis effects that are developing at a myriad of observation stations located in lowland streams.

According to another aspect, a method for estimating stream flow data of a channel is provided. The method includes acquiring direct measurements of an index velocity of the channel, acquiring stage measurements for the channel, and acquiring the slope of the free surface over a short distance and using these variables in a data-driven model combining the index velocity and the continuous slope-area methods to estimate stream flow data of the channel without using conventional rating curves. The index velocity may be measured using a HADCP. The stage measurements may be provided by a first stage sensor and a second stage sensor. The slope of the channel used in the stream flow computation may be based on a digital elevation model (DEM) or may be measured directly such as through a LIDAR survey. The changes in the stream flow may be associated with one or more pulses which may be associated with a storm. The stream flow-data may be determined in real-time such as during a storm. The data-driven model may apply canonical open-channel equations.

According to another aspect, a system for estimating stream flow data of a channel is provided. The system includes a measurement device for measuring index velocity of the channel, a first stage sensor and a second stage sensor for acquiring stage measurements and free surface slope for the channel, and a computing device configured to receive as input index velocity of the channel and the stage measurements for the channel and to apply a data-driven model combining the index velocity and the continuous slope-area method to estimate stream flow data of the channel. The measurement device may be a Horizontal or Vertical positioned Acoustic Doppler Current Profiler (ADCP). The free-surface slope used in the continuous slope-area method is determined through direct measurement. The system may further include a forecasting model stored on a machine readable medium configured for receiving as input the stream flow of the channel. The data driven model may be configured to apply canonical open-channel flow equations.

According to another aspect, a method for estimating stream flow data of a channel, includes steps of measuring an index velocity of the channel using a Horizontal or Vertical positioned Acoustic Doppler Current Profiler (ADCP), acquiring stage and free-surface slope measurements for the channel using a first stage sensor and a second stage sensor, acquiring slope for the channel for use in a continuous slope-area method, and applying a data-driven model combining the index velocity and the continuous slope-area method using the index velocity, stage measurements, and the slope to estimate stream flow data of the channel without using conventional rating curves. The data-driven model may apply canonical open-channel equations. The method may further include communicating the stream flow data to a forecasting model.

According to another aspect, a method for estimating stream flow data of a channel includes acquiring direct measurement of an index velocity of the channel, acquiring stage measurements for the channel for use in determining slope of a free surface, and applying a data-driven model combining the index velocity and a continuous slope-area method which uses the slope of the free surface to estimate stream flow data of the channel without using conventional rating curves. The method may further include acquiring the direct measurement of the index velocity of the channel is performed using a Horizontal or Vertical positioned Acoustic Doppler Current Profiler (ADCP). The acquiring the stage measurements may be performed using a first stage sensor and a second stage sensor. The method may further include acquiring a channel bed slope for use the continuous slope-area method such as from a digital elevation model or LIDAR or other measurement. The stream flow data may include one more pulses which may be associated with a storm. The stream flow data may be determined in real time. The data driven model may apply canonical open-channel flow equations.

According to another aspect, a system for estimating stream flow data of a channel is provided. The system includes a measurement device for measuring index velocity of the channel, a first stage sensor and a second stage sensor for acquiring stage measurements for the channel for use in determining slope of a free surface, and a computing device configured to receive as input index velocity of the channel and the stage measurements for the channel and to apply a data-driven model combining the index velocity and the continuous slope-area method which uses the slope of the free surface to estimate stream flow data of the channel.

According to another aspect, a method includes measuring an index velocity of the channel using a Horizontal or Vertical positioned Acoustic Doppler Current Profiler (ADCP), acquiring stage measurements for the channel using a first stage sensor and a second stage sensor, determining a free slope for the channel from the stage measurements for use in a continuous slope-area method, obtaining a channel bed slope for use in the continuous slope-area method, and applying a data-driven model combining the index velocity and the continuous slope-area method to estimate stream flow data of the channel without using conventional rating curves.

BRIEF DESCRIPTION OF THE DRAWINGS

Illustrated embodiments of the disclosure are described in detail below with reference to the attached drawing figures, which are incorporated by reference herein.

FIG. 1A illustrates stage vs. water free-surface slope. FIG. 1B illustrates stage vs. index velocity. FIG. 1C illustrates stage vs. discharge. FIG. 1D illustrates phase sequencing of the flow variable hydrographs. (Rising and Falling terms in FIGS. 1A-1D) are used to identify the cycling of the stage (i.e., from steady flow stage to Hmax).

FIG. 3A illustrates a single-pulse storm event. FIG. 3B illustrates a multiple-pulse storm event. (Muste et al., 2022).

FIG. 4A illustrates sequencing of the time series of the flow variables for storm #4. FIG. 4B illustrates stage vs. index velocity relationship for storm #4. FIG. 4C illustrates stage-discharge relationship for all major storms of 2017.

FIG. 5A illustrates sequencing of the time series of the flow variables. FIG. 5B illustrates stage vs. free-surface slope relationship. FIG. 5C illustrates stage vs. discharge relationship. Rising and falling terms in the plots specify stage variation phases (i.e., from steady flow to Hmax).

DETAILED DESCRIPTION

1. Introduction

Figure 1:
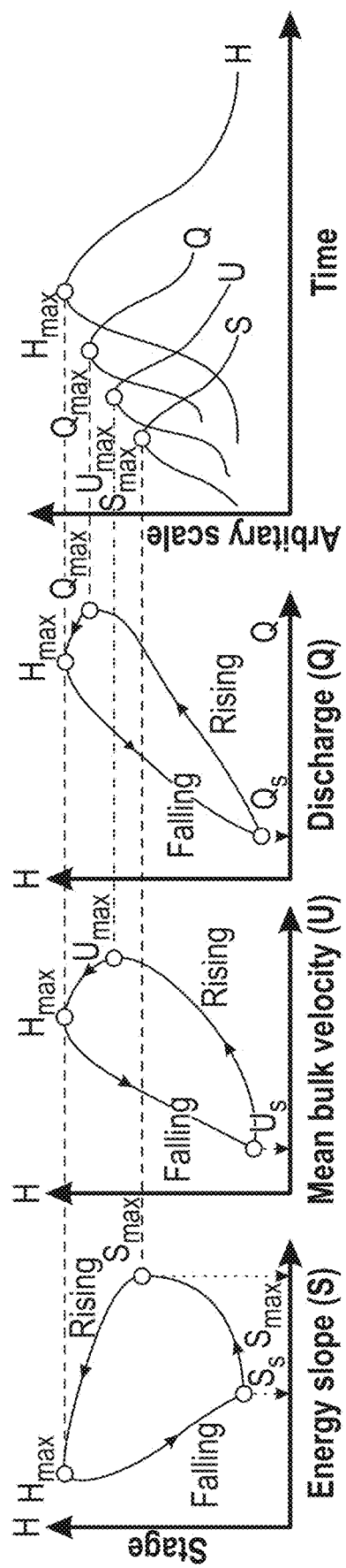
FIG. 1A, FIG. 1B, FIG. 1C, and FIG. 1D illustrate hysteresis effects of flow variables during the evolution of cyclical processes (Muste & Kim, 2022).

The present disclosure provides for track flow cyclical changes of the variables (called herein pulses) through a new monitoring method. The pulse of a variable as defined herein is a series of consecutive data points in the flow stream variables cycling from a lower value to a peak and then returning at the initial position. These pulses are generated by the initiation of a rainfall event or changes in the rainfall intensity and/or its spatial distribution over the station's drainage area. We introduce herein the term "pulse" to enable the distinction between a single- and multi-pulse hydrograph associated with the propagation of a flood waves. The proposed method ingests directly measured flow variables and their gradients into canonical equations for unsteady flows (also valid in steady flows) applied to gaging sites where the best practices for site selection are strictly followed (Rantz et al. 1982b). The monitoring method's innovation consists in: a) the adoption of a reach-scale approach; and b) capturing changes of all flow variables in real time over the full duration of the flood wave propagation without making recourse to rating curves. The disclosure presents the fundamentals of the proposed measurement concept and provide a possible configuration and deployment of the measurement system. This disclosure presents selected results from prior work with components of the proposed system to illustrate the possibility to monitor unsteady flows pulse by pulse.

2. Measurement Concept and Implementation 2.1 Measurement Concept

We build our measurement concept around the Saint-Venant shallow-water two-dimensional equations (Chow, 1959) supported by directly measured data at the gaging site. Given that the targeted outcome of the measurement is the discharge, we adopt the arrangement of these equations offered by Knight (2006):

$$Q = Q_s \sqrt{1 - \frac{1}{S_0}\frac{\partial h}{\partial x} - \frac{U}{gS_0}\frac{\partial U}{\partial x} - \frac{1}{gS_0}\frac{\partial U}{\partial t}} \quad [1]$$

where Q, is the unsteady flow discharge, $Q_s$ is the steady-uniform discharge, h is the flow depth, U is the cross section mean velocity, t is time, and x is the distance along the channel direction. Note: typically, flow depth is determined from measurements of free surface elevation (a.k.a. stage), H. The steady-uniform flow discharge, $Q_s$, is derived from Manning's equation (Chow, 1959):

$$Q_s = \frac{1}{n} AR^{2/3} \sqrt{S_0} = K\sqrt{S_0} \quad [2]$$

where, n is the Manning's roughness coefficient, A is the cross-sectional area, R is the hydraulic radius, $S_0$ is the bed slope, and $K = (1/n) AR^{2/3}$ is the channel conveyance (in metric units). Equation [1] is strictly valid under the following assumptions: incompressible fluid, one-dimensional flow, hydrostatic pressure distribution, and negligible vertical acceleration. For the present context, it is important to highlight that these qualifiers are essentially met if the best practice guidelines for gaging site selection as prescribed in Rantz et al. (1982b) are applied (i.e., quasi-prismatic and straight channels without lateral inflows or outflows). In the preliminary stages of the technique development, we will limit the testing of the technique to clear-cut flow situations to enable its evaluation without flow complexities. From this perspective, we will analyze flood waves propagating in channels predominantly controlled by friction (channel control) rather than channel geometric features (local control) (WMO, 2010). Moreover, we will limit our analysis to flows up to bankfull stages, as the mass and momentum exchanges between the main channel and floodplain above this stage generate additional complexities that impede hysteresis impact interpretation. Under these conditions, the major contributor to hysteresis is the flow unsteadiness and backwater that are well described by the governing equations for unsteady flow, as illustrated in (Henderson, 1966; and, Fenton & Keller, 2001). However, in some embodiments, open-channel flows may be modeled with real-time estimation of the Manning's roughness coefficient which tracks quantitatively and qualitatively factors associated with change in the roughness coefficient during the vegetation season cycling including from photography of channels and ancillary descriptions with estimated n-value tables, direct estimation from known discharges and channel hydraulic properties and combinations thereof.

Previous analyses of Equation [1] for channel flow routing (Ferrick, 1985; Arico et al., 2008) have shown that it provides a realistic hydraulic description of flood waves (i.e., non-uniform, unsteady flows) irrespective of their type: kinematic (first term only), diffusion (first and second terms), and full dynamic (all terms). The magnitude of the individual terms in Equation [1] is commensurate with the slope of the bed at the site and the intensity of the propagating wave (i.e., its magnitude vs. duration). The practical guidelines for identification of the potential type of waves suggest that inland rivers located on mild and small bed slopes develop full dynamic waves (e.g., Julien, 2002) while rivers located on large bed slopes develop kimematic waves (Arico et al., 2008).

For hysteresis-prone sites, it is expected that direct measurements of the variables and their gradients in Equation [1] will substantiate dependencies as illustrated in FIG. 1A-1D (Muste et al., 2020): i) non-unique relationships for the pairs of flow variables during the rising and falling limbs of flood wave propagation, as illustrated by the loops in (FIGS. 1A-1C); ii) separation of the flow variable hydrographs (see FIG. 1D). It is to be mentioned that if a monitoring method captures the loops in the flow variables relationships in time-independent coordinates, it also substantiates the phase hydrograph sequences in the time-dependent visualizations. The features conceptually illustrated have been recently documented with measurements conducted at various sites using different monitoring methods, i.e., the index-velocity method (Muste & Kim, 2020) and the continuous slope-area method (Muste et al., 2019).

The newly developed measurement concept builds on proof-of-concept measurements and analysis of unsteady flows documented by the index-velocity and continuous slope-area method (Muste et al., 2020). For easiness of reading, we will label with IVRC and CSA acronyms for the two cited methods, and with HQRC the widely used stage-discharge method. The proposed method is distinct from the past approaches that aimed at correcting the stage-discharge rating (labeled HQRC for convenience) using free-water slope as a parameter (Dottori et al., 2009). The HQRC correction methods include a) the fall-stage relationship (Rantz et al., 1982a); b) the Hydraulic Performance Graph and Hydraulic Performance Curve developed by Yen & Gonzalez-Castro (2000) and Schmidt (2002), respectively, and c) the Dynamic Rating Curve (DyRaC) developed by Dottori et al. (2009). Similarly, to Dottori et al. (2009), the new method assumes that the discharge between two adjacent sections is constant, hence hypothesizing that the discharge is practically constant within the measurement reach (i.e. $\partial Q/\partial x \approx 0$).

2.2 Implementation

Figure 2:
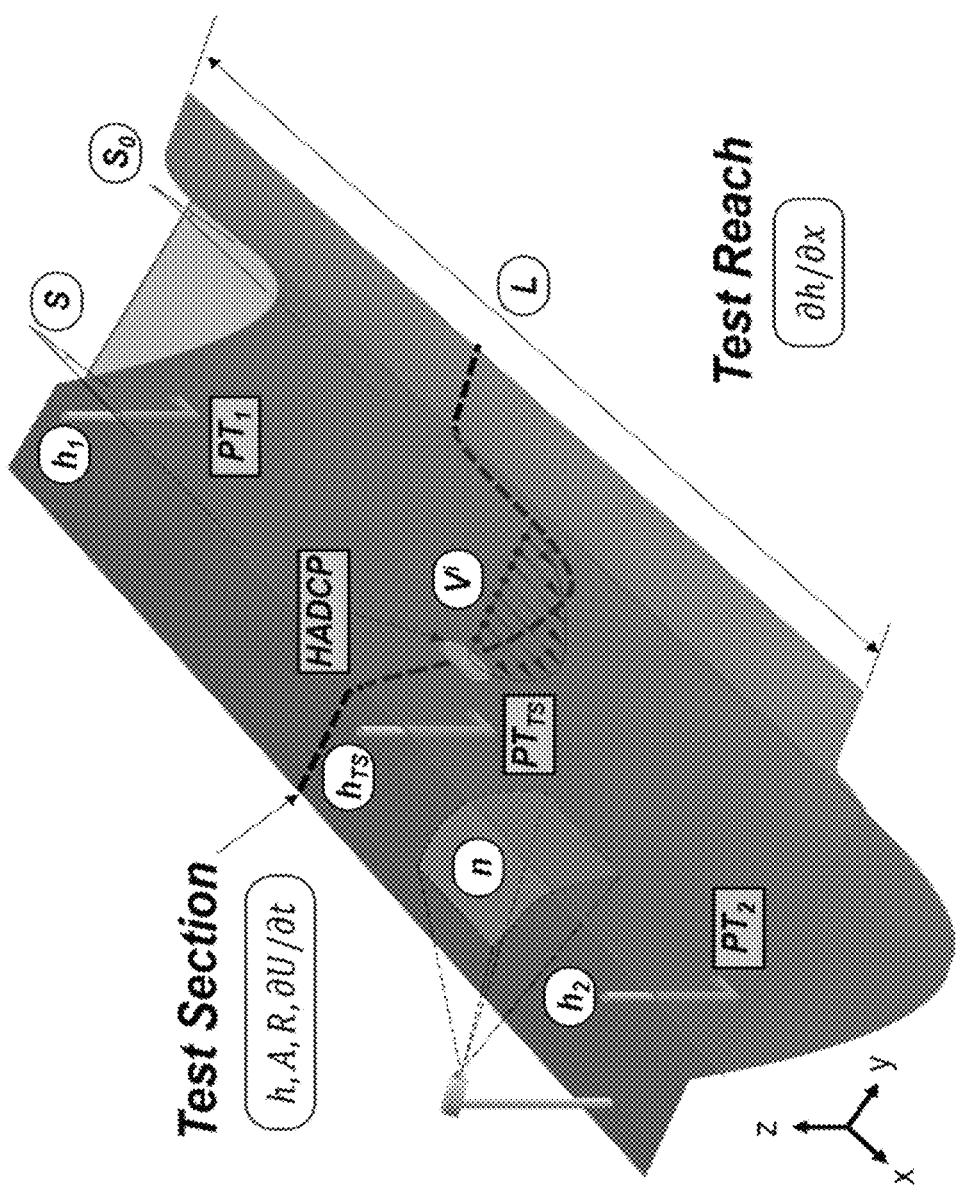
FIG. 2 illustrates the equipment to be deployed at the newly designed monitoring stations.

FIG. 2 illustrates the equipment to be deployed at the newly designed monitoring stations. Also shown in the figure is the association between the deployed instruments and measured quantities. For the initial phase of this research, we will consider adding equipment to an existing USGS station i.e., USGS #05558300, where this research team conducted previous analysis (with some results reported in Section 3). The site is prone to hysteresis and serves as an operational forecasting point on Illinois River, IL. This operational index-velocity station is already equipped with a Horizontal or Vertical positioned Acoustic Doppler Current Profilers (ADCP) and a stage sensor, labeled as HADCP and $PT_1$ in FIG. 2. We will estimate the bed slope either from available information (high-resolution DEM) or direct measurements (Lidar surveys). Water stages (H) at the start and end of the test section will be acquired by adding a second stage sensor ($PT_2$) of the same high accuracy as the existing one. In order to comply with the constant flow rate assumption mentioned above, the distance between the reach ends should be small and the free-surface slopes be acquired with fast sampling rates. The distance between the stage sensors cannot be, however, drastically reduced as the measured water surface fall needs to be sufficiently large to not be hindered by the instrument resolution and water level fluctuations.

Measurement of index velocity ($V^i$) will be made with the existing (HADCP) that enables acquisition of two- or three-velocity components at multiple points along the instrument axis that are then averaged to provide an index velocity averaged over the cross-section. To fully automate the real time delivery of the streamflow data, we need a reliable relationship for converting the index velocity ($V^i$) measurements into bulk cross-sectional flow velocity (U) and for determining the bulk velocity gradient $\partial U/\partial x$ in Eq. (1). The conversion of the index velocity to bulk velocity will be tested with a) power and logarithmic laws (e.g., Le Coz et al., 2008); b) semi-empirical velocity distribution laws for natural streams developed by (Rijn, 1986); and c) probabilistic methods applied to index velocity time series, proposed by (Chen et al., 2012). Estimation of the $\partial U/\partial x$ in Eq. (1) will be tested first using the approach developed by Sriwongsitanon et al. (1998). In this approach, the wave speed (obtained from the free-surface slope) is related to bulk flow velocity, with separate relationships for the rising and falling hydrograph phases. Searching for optimal solutions for the conversion of index velocity to bulk velocity will be tested against direct discharge measurements acquired with ADCP transects (a.k.a. calibration/validation measurements). The ADCP data are periodically collected for verification of the rating curves at USGS stations and for enforcing the rating at high flows. We will sample data streams 3 to 15 minutes apart, which is a temporal resolution that is appropriate for capturing the wave propagation. A minimum of one-time topographic survey is needed to capture the geometry of the beginning and end of the reach section and to locate the instruments' positioning after deployment. Optionally a web-camera deployed at the site can be used for tracking sensitive changes in riparian vegetation of other river flow features (e.g., debris or ice accumulations).

3. Expected Results

Tracking flow variables during pulses with high-temporal resolution in real time have the potential not only to improve the accuracy of streamflow monitoring in unsteady flows at hysteresis-prone sites but to also reveal dependencies among the flow variables that offer new insights into stream processes and their forecasting. To substantiate the discussion of the potential benefits of the proposed monitoring methodology, we present selected results obtained with subcomponents of the methodology, i.e., the index-velocity method (IVRC) and Continuous Slope-area method (CSA). While the results complement each other in confirming intrinsic features of the stream hysteretic behavior illustrated in FIGS. 1A-1D, they were obtained on two streams considerable different by size, flows, and hysteresis magnitude. Another impetus for presenting this type of experimental evidence is the fact that, while the data present below are publicly available, the analysis of the available evidence as conducted in this disclosure is quite rare (if done at all).

3.1 Pulse Characterization

Figure 3A:
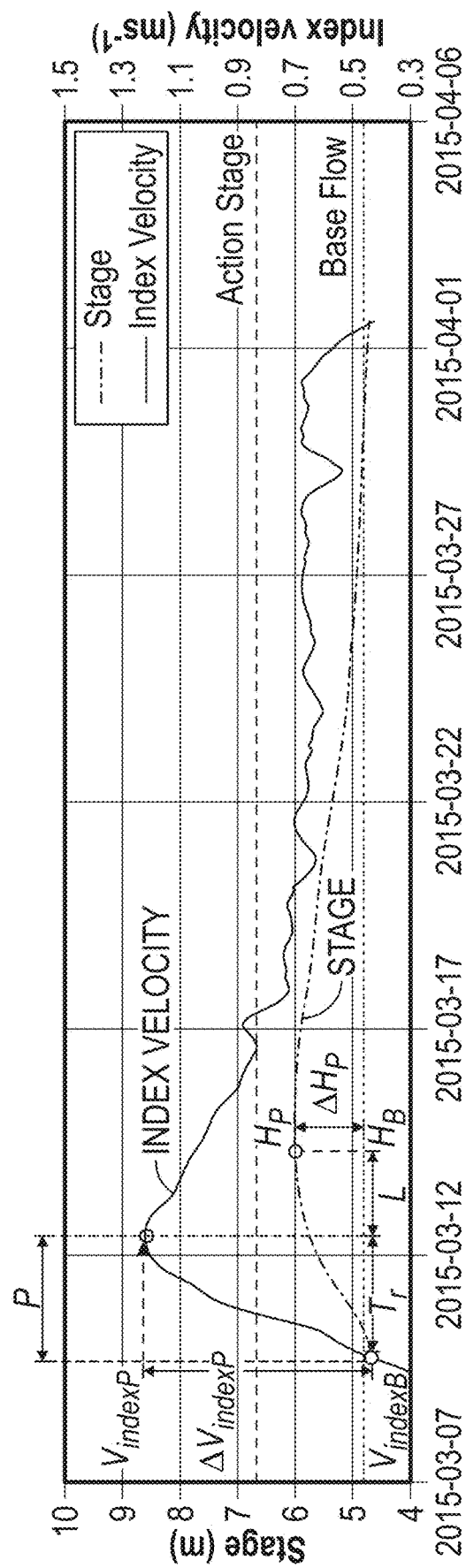
FIGS. 3A, and 3B are identification of the hysteresis-related patterns leading to the flood wave crest.
Figure 3B:
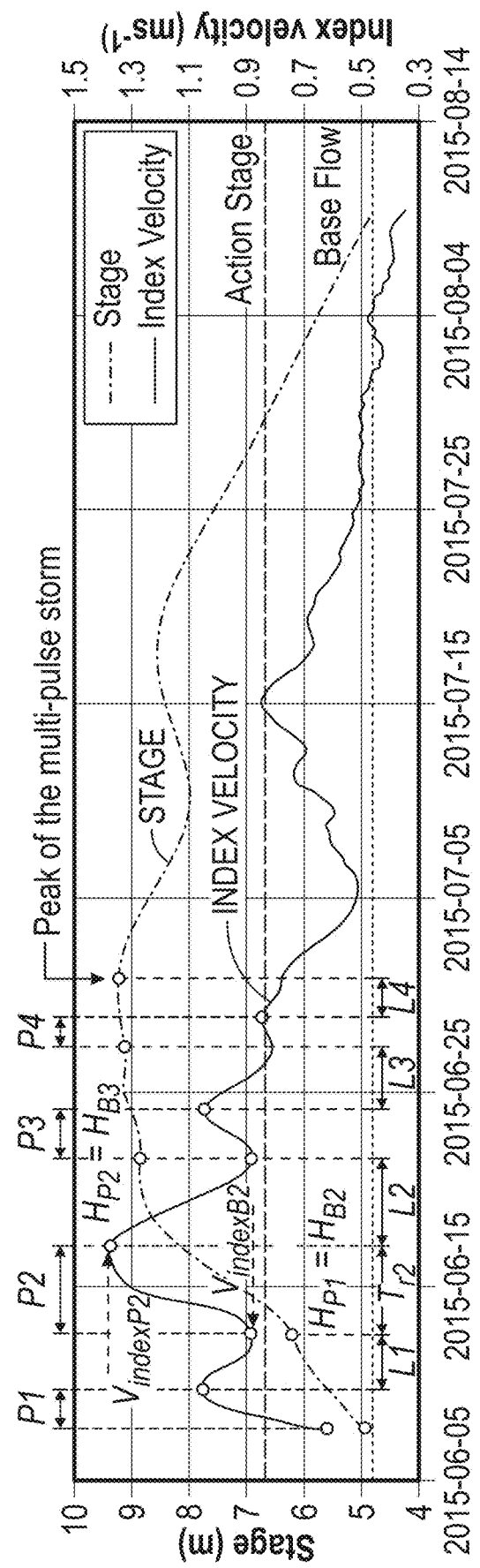

Ensuing from the graphical description in FIG. 1D, is that the propagation of one non-kinematic flood wave produces flow variable hydrographs that are phased in time. The simplified illustration in FIG. 1D is valid for a single-pulse storm. The single-pulse storms are quite rare in natural streams, as observed in the analysis of 6 years of data at the USGS index-velocity station #05558300 (Muste & Kim, 2020). The phasing of the hydrographs for the index-velocity and stage as observed for a single-pulse storm recorded at this station is shown in FIG. 3A. The time ratios between the rising and falling stage of single-pulse storm hydrographs varied at this site between 1:3 and 1:10, depending on the magnitude and intensity of the storm pulse. FIG. 3A and FIG. 3B contain additional notations that are used to characterize individual pulses embedded in single- or multi-pulse hydrographs, their interdependence in time, and rates of changes (gradients). Most of the storms contain multiple pulses that combine their impact during the flood wave propagation. The effect of the superposition of the individual pulses for a multi-pulse storm can be tracked in the index-velocity and stage hydrographs plotted in FIG. 3B. We deem that this distinction between single- and multiple-pulse storms is important for the analysis and forecasting of the flood crest, as the magnitude and timing of the flood crest are determined by the incremental changes of the flow variables on the rising limb of the stage hydrograph (Muste et al., 2022). Moreover, the number of pulses and the characteristics of the pulses on the rising limb of the stage hydrograph are decisive for determining the severity of the hysteretic loops (De Sutter et al., 2001; and, Mrokowska & Rowinski, 2019).

3.2 Hysteretic Effects in the Pulses

Figure 4A:
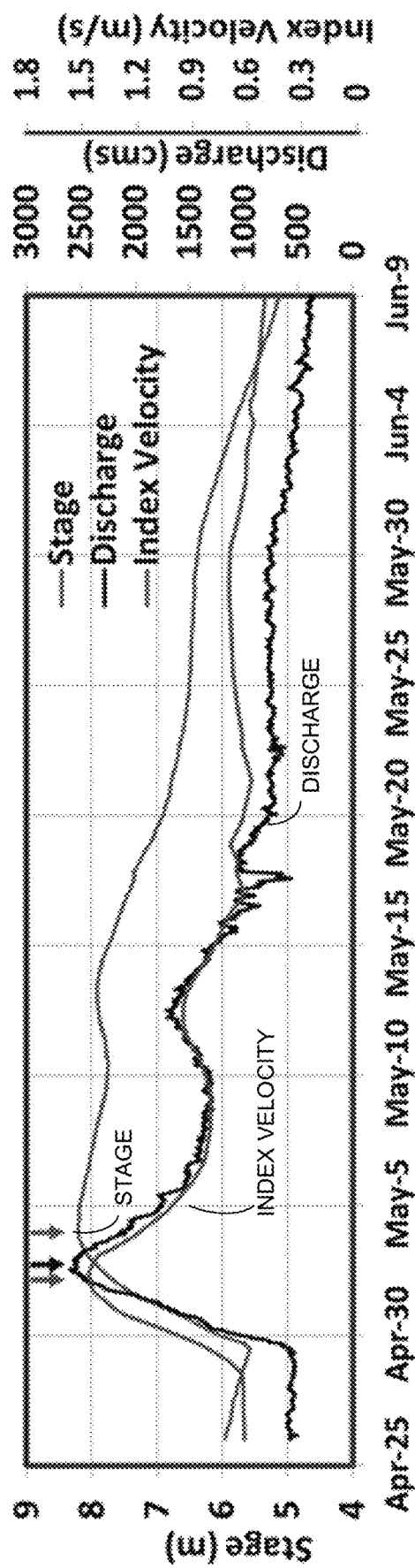
FIGS. 4A, 4B, and 4C are hysteresis impact on flow variables at USGS index-velocity station #05558300 for water year 2017 (Muste & Kim, 2020).
Figure 4B:
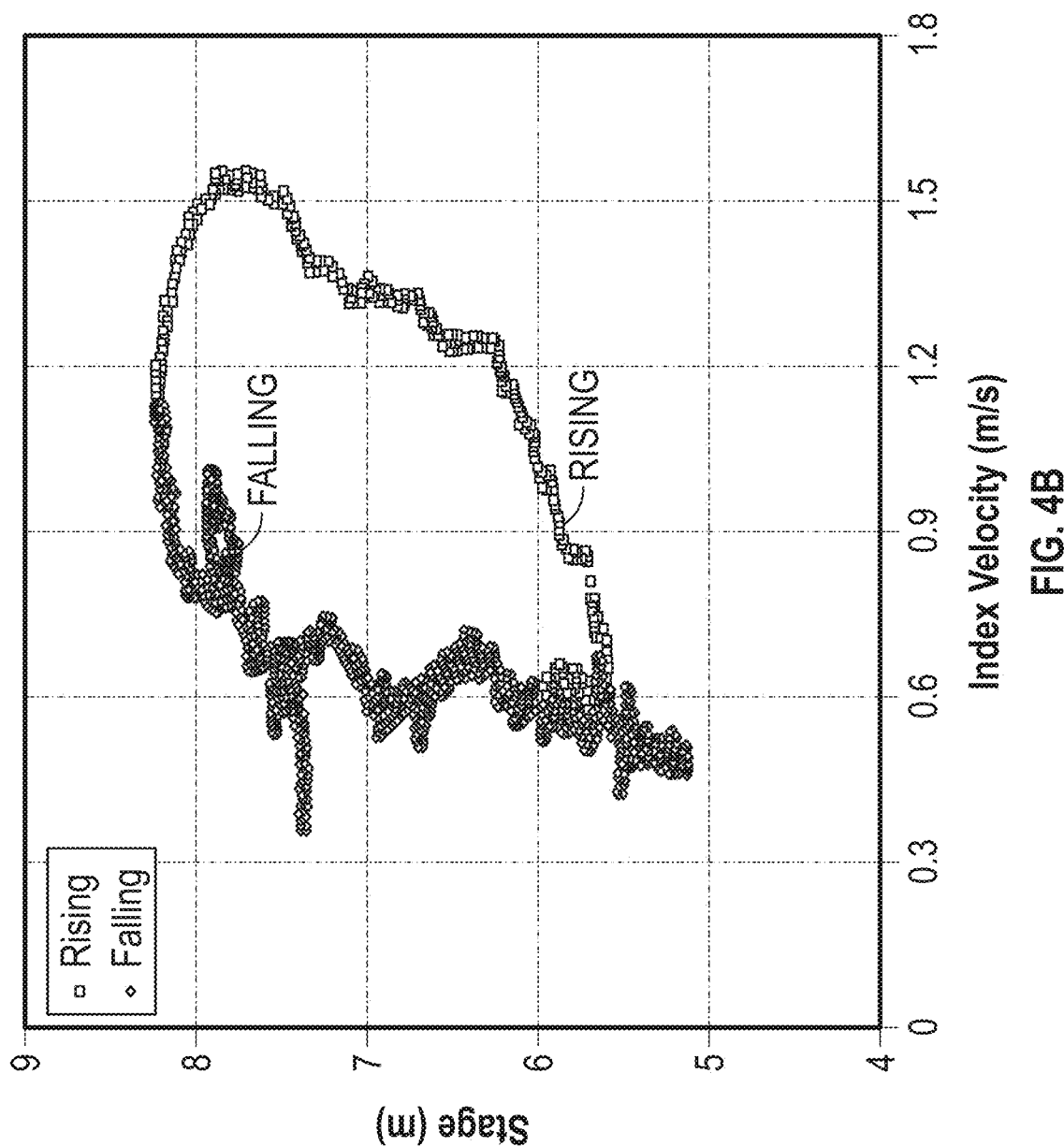
Figure 4C:
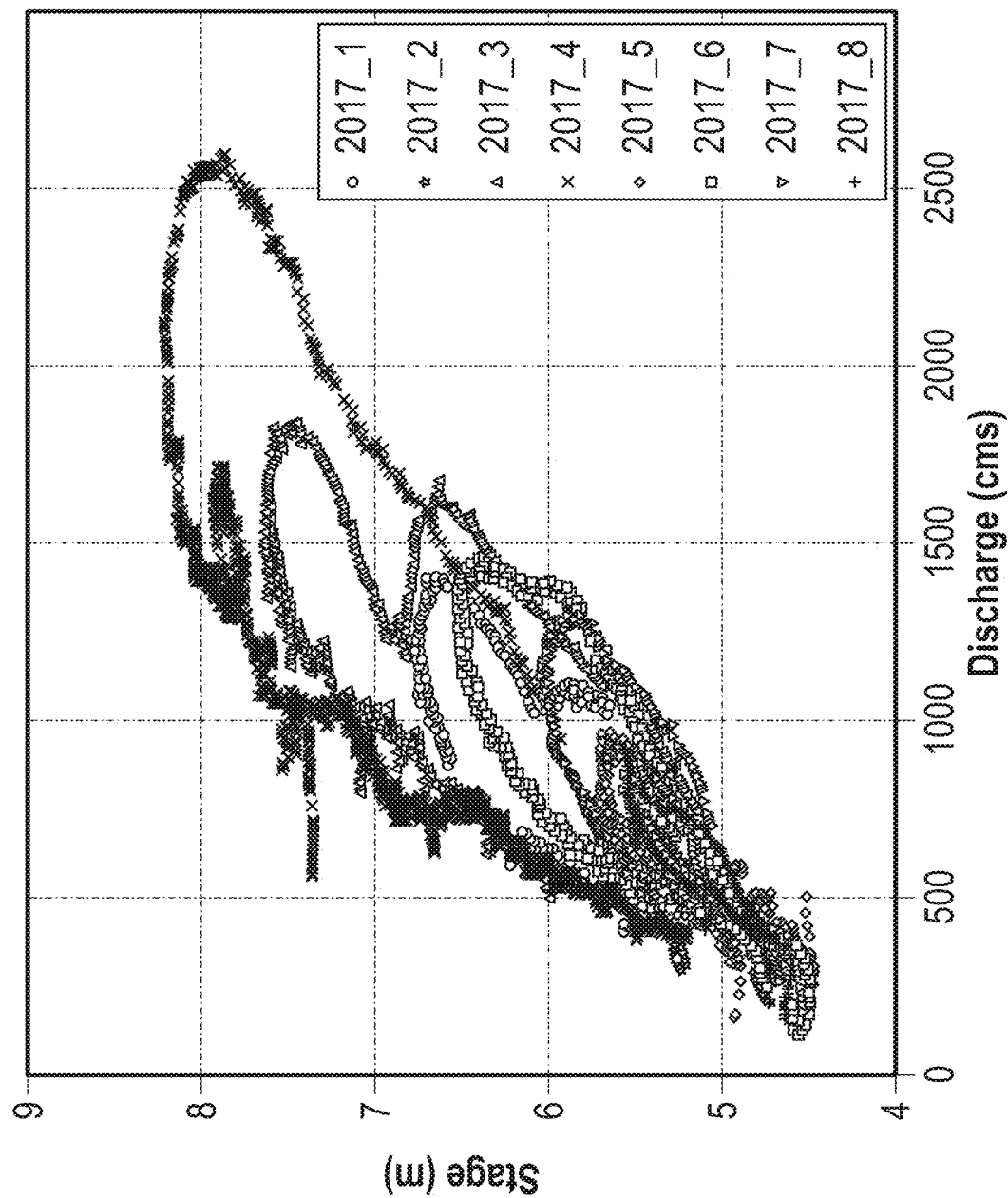

The graphical description of the hysteresis shown in FIG. 1A-1D indicate that if the time phasing is apparent in the recorded hydrographs, there are certainly loops in the relationships among any of the two variables measured for the same event at that location. In a previous analysis conducted at a USGS index-velocity station exposed to hysteresis, we found convincing and abundant experimental evidence of the above-described dependencies, as illustrated in FIG. 4A-4C (Muste and Kim, 2020). First, the phasing in the time series of the flow hydrographs for all types of storm events follows the sequence illustrated in FIG. 4A: index-velocity first, discharge next, and lastly the depth hydrograph. Similar findings about phasing of the hydrographs are noted by a recent work conducted at another station where the free-surface velocity measured with radar and stage hydrographs were compared (Khan et al, 2021). It is worth mentioning, that for the largest storm of the year 2017 at this USGS gaging station, the time between the index-velocity and stage peaks was 2.5 days (see FIG. 4A). For the largest storm recorded in the 2013-2019 analysis interval, the time between the same peaks was 3.75 days! This magnitudes for the lags suggest the phasing of the hydrographs at hysteresis-prone sites can be exploited for short-term forecasting purposes.

Second, it is expected that the extent of the time phasing is proportional with the loop thickness—defined as the maximum difference between the independent variable for the same stage (e.g., on the looped index velocity in FIG. 4B). The thicker the loop the larger the time between the index velocity and stage peaks. The loop thickness is in turn dependent on the intensity of the propagating wave (i.e., its magnitude vs. duration). Using the parameterization of the pulses described in FIG. 3A, 3B, we developed analytical relationships to uniformly quantifies the intensity (a.k.a. severity) of the pulse (Muste et al., 2022). Furthermore, we observed that each pulse in a multi-pulse storm produces its own loop in the time-independent representation of the flow variable dependencies and in the associated sequencing in the variables' hydrographs. FIG. 4C illustrates all the major storms of year 2017 recorded at this station, represented in the conventional stage-discharge coordinates. It can be observed in this figure that each storm event passing through the site has a distinct signature that in turn reflects the magnitude of the individual storm pulses and their intensity up to the stage hydrograph peak (flood crest).

Figure 5A:
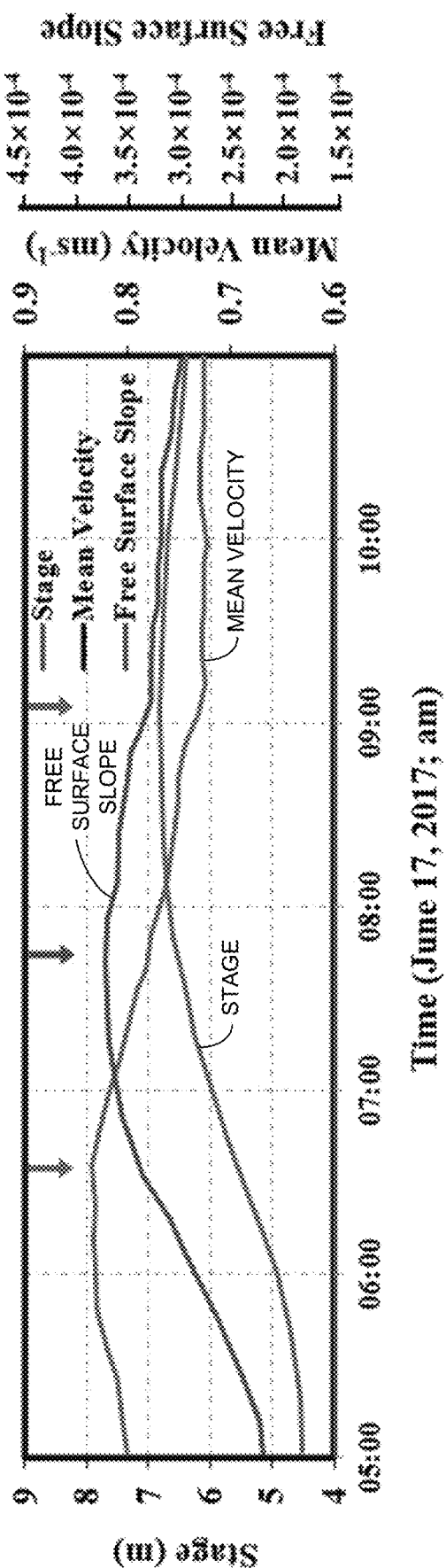
FIGS. 5A, 5B, and 5C are hysteresis impact on flow variables captured with the continuous slope area method at a site during the propagation of single-pulse storm in the spring of 2017 (Muste et al., 2019).
Figure 5B:
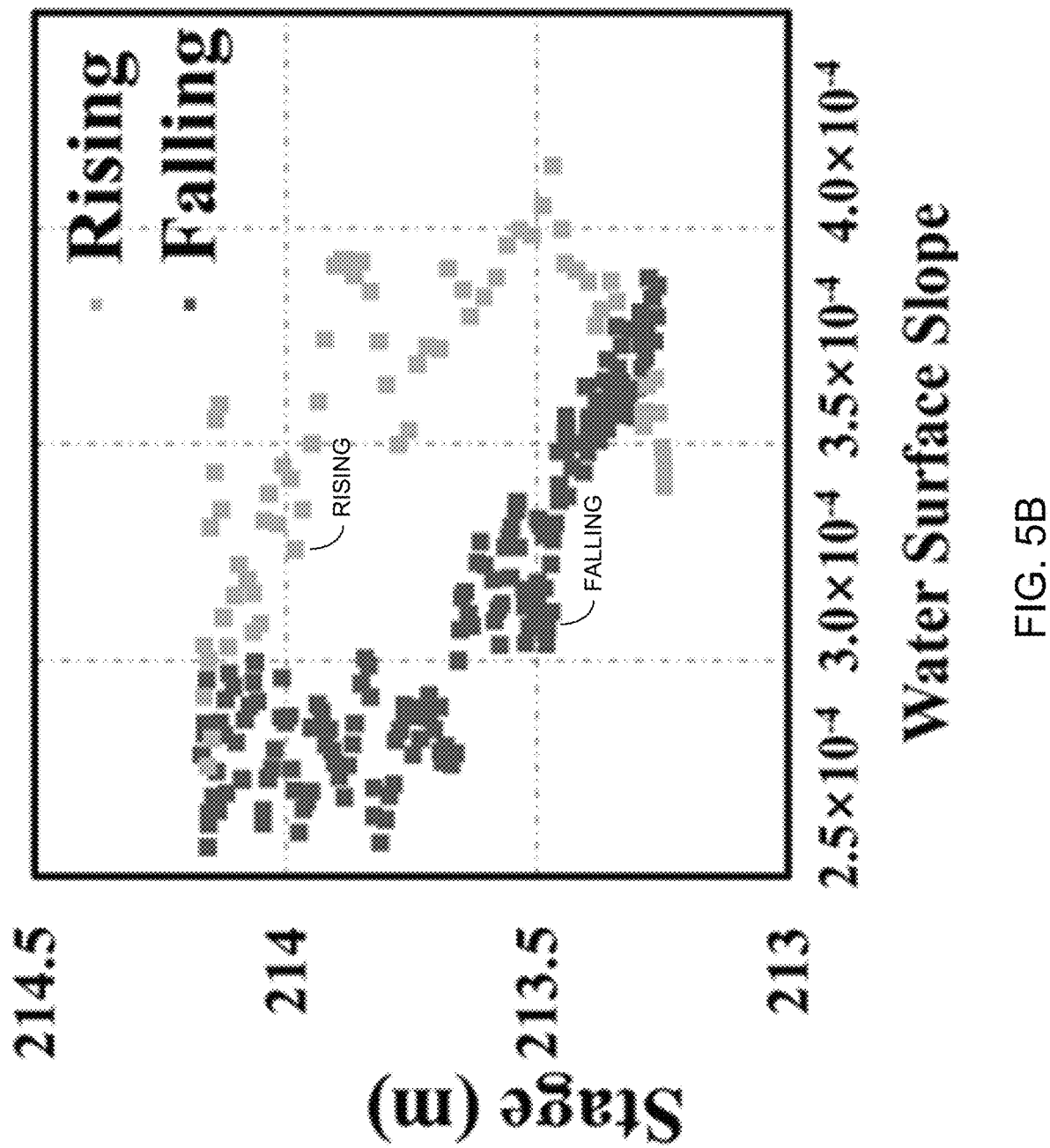
Figure 5C:
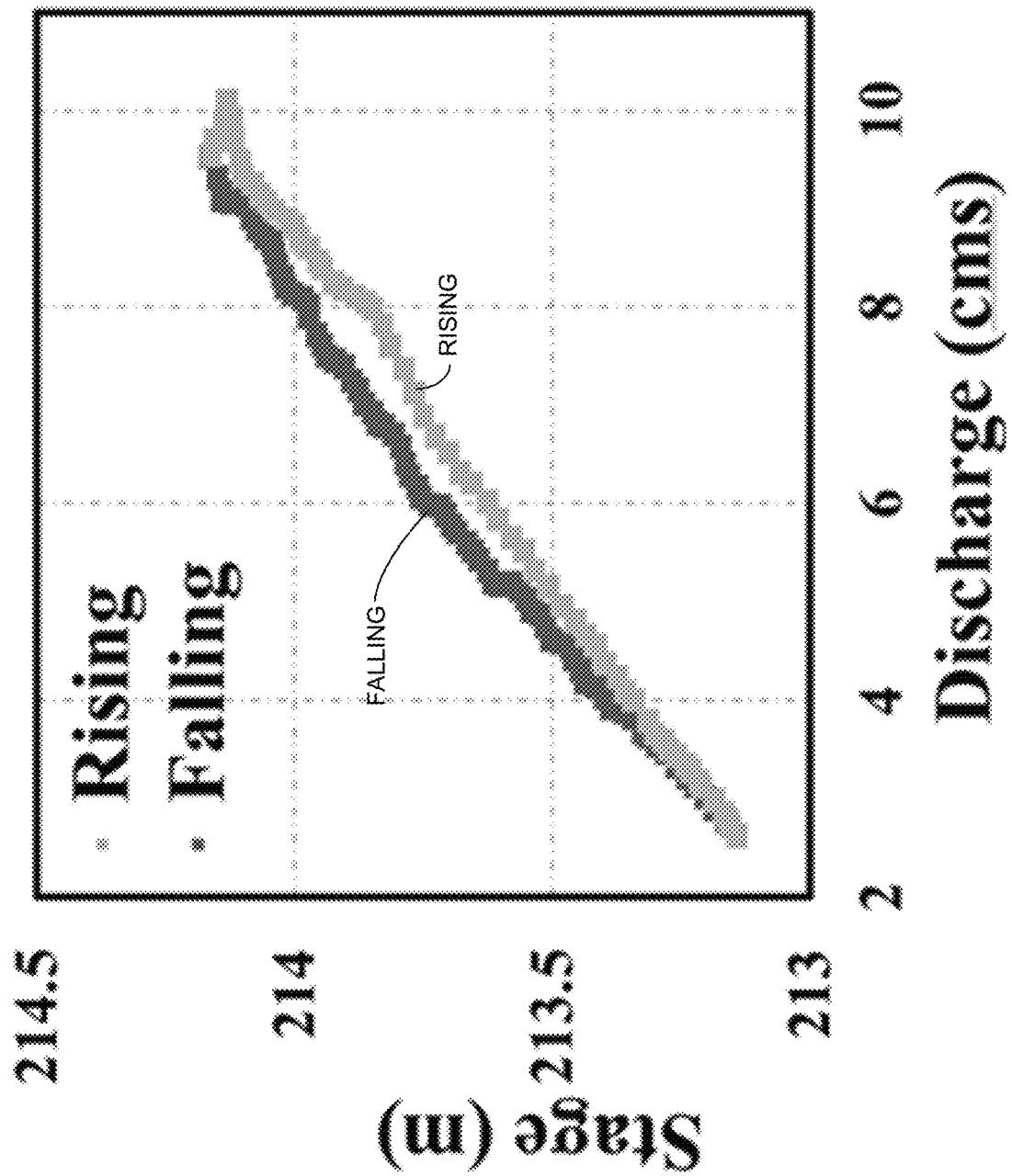

To further explore the hysteretic impact on flow variables beyond the illustrations enabled by the IVRC method, shown in FIG. 4A-4C, we add herein in-situ measurements acquired with the CSA method during one of the spring storms passing through as hysteresis-prone station (Muste et al, 2019). The free-surface slope used in conjunction with Equation [2] was acquired with fast-sampled pressure sensors set 200 m apart. Like Equation [1], the implementation of CSA using Equation [2] is only valid for sites that are controlled by friction forces over the measurement reach (i.e., quasi-constant shape and straight channels). FIG. 5A-5C substantiate the capabilities of the CSA method to reveal: a) phasing among flow variables; b) looped relationship between free-surface slope (that is proportional to the energy slope for short reaches) vs. stage; and c) looped stage vs. discharge relationship (Muste et al., 2019).

The plots in FIG. 5A-5C display shapes similar to those in the relationship shown in FIG. 1D, 1C, 1D, respectively. The time difference between the free-surface and stage peaks for this small stream is 2.25 hours (see FIG. 5A) which is much smaller than the 2.5 days observed in the larger stream illustrated in FIG. 4A. The time separation in the stage-discharge relationship in FIG. 5A is much smaller than that shown in FIG. 4A because of the wide difference in river size (i.e., about one order of magnitude difference in stream width) and the much narrower range for the variation of the flow variables. Even for such small hysteretic effects, we observed a difference of 16% in the discharge for the same stage in the area of maximum loop thickness.

The plots of the direct measurements illustrated in FIGS. 4A-4C and FIGS. 5A-5C reveal that sampling the flow variables in situ with high-temporal resolution measurements allows for capturing the hysteresis associated with the gradual propagation of flood waves, regardless of the river size. The hydrographs and the dependencies among the variables were directly measured in real-time using commercially available instruments proving that this type of measurements are actually achievable in field conditions. The experimental evidence presented in this section testifies that the fine-detail characterization of the streamflow pulses enables us to better understand the complex flow physics of open-channel flows subjected to hysteresis, and, at the same time, opening opportunities for further develop new approaches to explore rivers. Notable from the presented analysis is that the measurement of stage, index-velocity, or free-surface are sufficient to conceive new protocols for early flood warning alerts without the need to determine discharges, therefore circumventing the expensive and intensive effort of building the conventional ratings curves. Based on the inferences from these preliminary results, we are confident that the novel combination of the aforementioned methods will be better than any of the components working alone.

4. Conclusions

Motivated by the realization that there is a historic gap between the open-channel canonical governing equations and the principles for monitoring streamflow data in natural streams, this disclosure includes some recent experimental results to illustrate that the new generation of high-temporal resolution instruments, complemented by physically-sound analytical considerations, can provide new and valuable experimental evidence on the dependencies between the streamflow variables in unsteady flows affected by hysteresis. The reported experimental results convincingly demonstrate that use of direct measurements acquired at index-velocity and continuous slope-area based gaging stations can accurately capture the hysteretic behavior associated with the gradual propagation of flood waves in real time. The two monitoring alternatives show promise in overcoming the well-known limitations of the stage-area method that basically totally ignores the hysteresis impact.

By combining the index-velocity and continuous slope-area method into one system, we set the foundations for a new, data science approach for real time estimation that enables hydrologists to estimate streamflow data more efficiently (by removing the expensive process of developing rating curves) and potentially providing short-term forecasting capabilities using only direct stream measurements. The disclosed methodologies allow for detecting and using hysteresis behavior as a reliable means of producing a new way for streamflow monitoring and forecasting using only direct in situ measurements for supporting scientific and practical purposes investigations in the riverine environments.

5. Options, Variations, and Alternatives

Although specific examples are shown and described, the present invention contemplates various options and alternatives and that the various methods and systems may be implemented in different ways.

Figure 6:
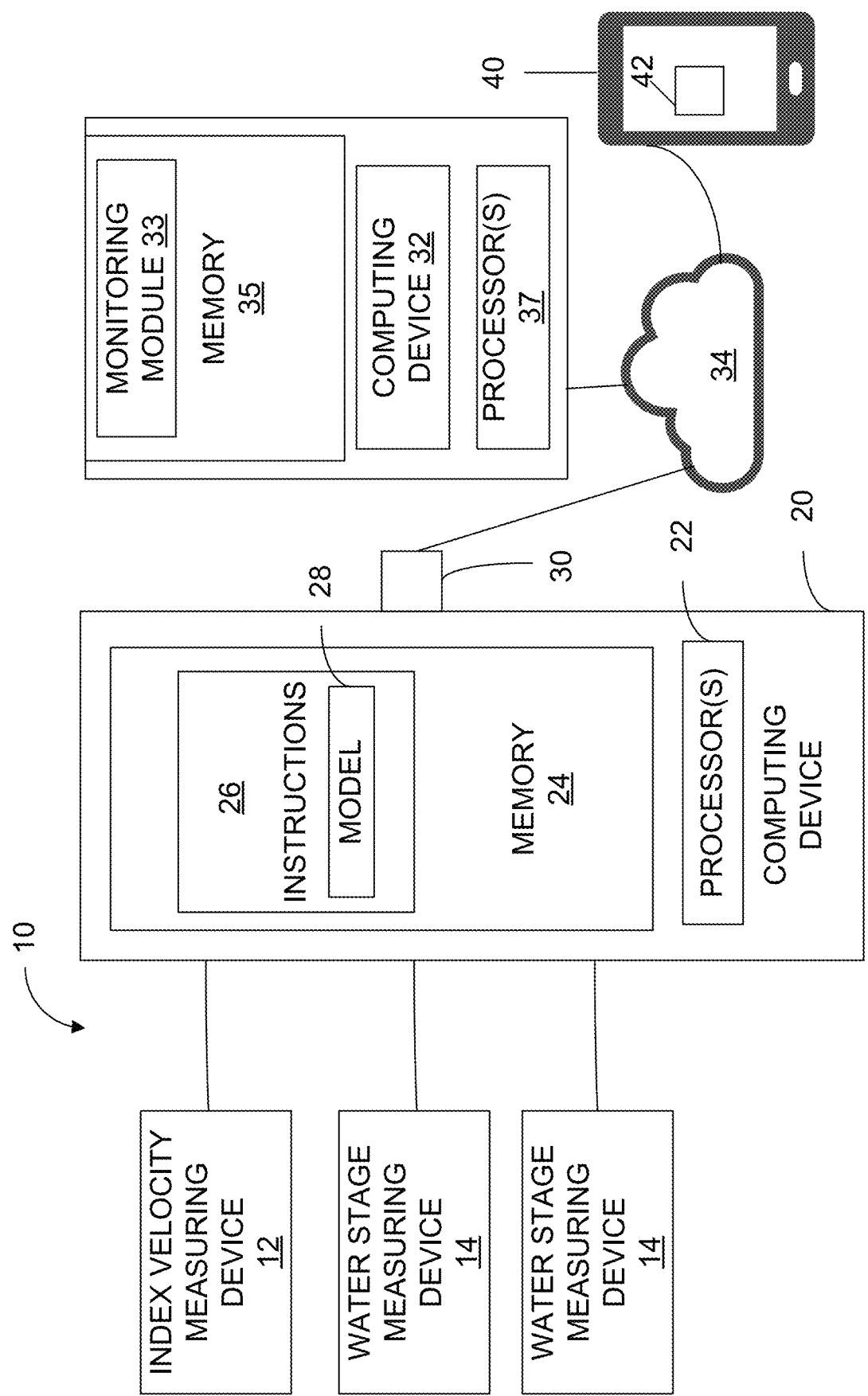
FIG. 6 is a pictorial representation of one example of a system.

FIG. 6 illustrates one example of a system for estimating stream flow data of a channel. The system 10 may include an index velocity measuring device 12 and first and second water stage measuring devices 14. The index velocity measuring device 12 and the water stage measuring devices 14 provide for measuring index velocity and water stage. In some embodiments, the index velocity measuring device 12 may be a Horizontal or Vertical positioned ADCP. A computing device 20 is shown which is in operative communication with the index velocity measuring device 12 and the water stage measuring devices 14. It is to be understood, that this need not be a direct linkage but any number of intermediary computing devices or communication devices may be present. The computing device 20 may include one or more processors 22 and a non-transitory computer readable memory accessibly by the one or more processors 22. The memory 24 may include a series of instructions 26 for implementing a data-driven model. In addition, the instructions 26 may provide for acquiring data from the index velocity measuring device 12 and the water stage measuring devices 14 directly or indirectly. The instructions 26 may apply a continuous slope-area method using the stage measurements and apply a data-driven model 28 which combines the index velocity and the continuous slope-area method such as elsewhere described herein. The computing device 20 may also include a network interface 30 which is operatively connected to the one or more processors 22. The network interface 30 allows the computing device to communicate over a network 34. Communications over the network 34 may be to, for example, communicate outputs from the model 28 to one or more computers 32, mobile devices 40, or other types of computing devices. For example, the output from the model 28 may be communicating to another computer or other computing device 32 over the network 34. The computing device 32 may have one or more processors 37 and a memory 35. The memory 35 may include instructions for defining a monitoring module 33. Thus e output from the model 28 may be used in any number of ways, including as input to the monitoring module 33. The monitor module may include a set of instructions combining directly measured data in real-time stream flows, including data from a plurality of different locations along a stream, locations within a network of streams or unrelated streams. This data may be combined and used in any number of forecasting models. The accuracy of forecasting models may be improved by using the output from the model 28 and from multiple locations along a stream or connected streams as opposed to using historical data. The results from the forecasting models may be used to generate an alert 42 on a mobile device or other types of devices. In addition, in some embodiments collected data and outputs from the model 28 may also be accessible from the mobile device. Note because the model is data-driven, outputs to a forecasting model may be used by the forecasting model to provide alerts such as to alert of flooding dangers caused by a storm.

Figure 7:
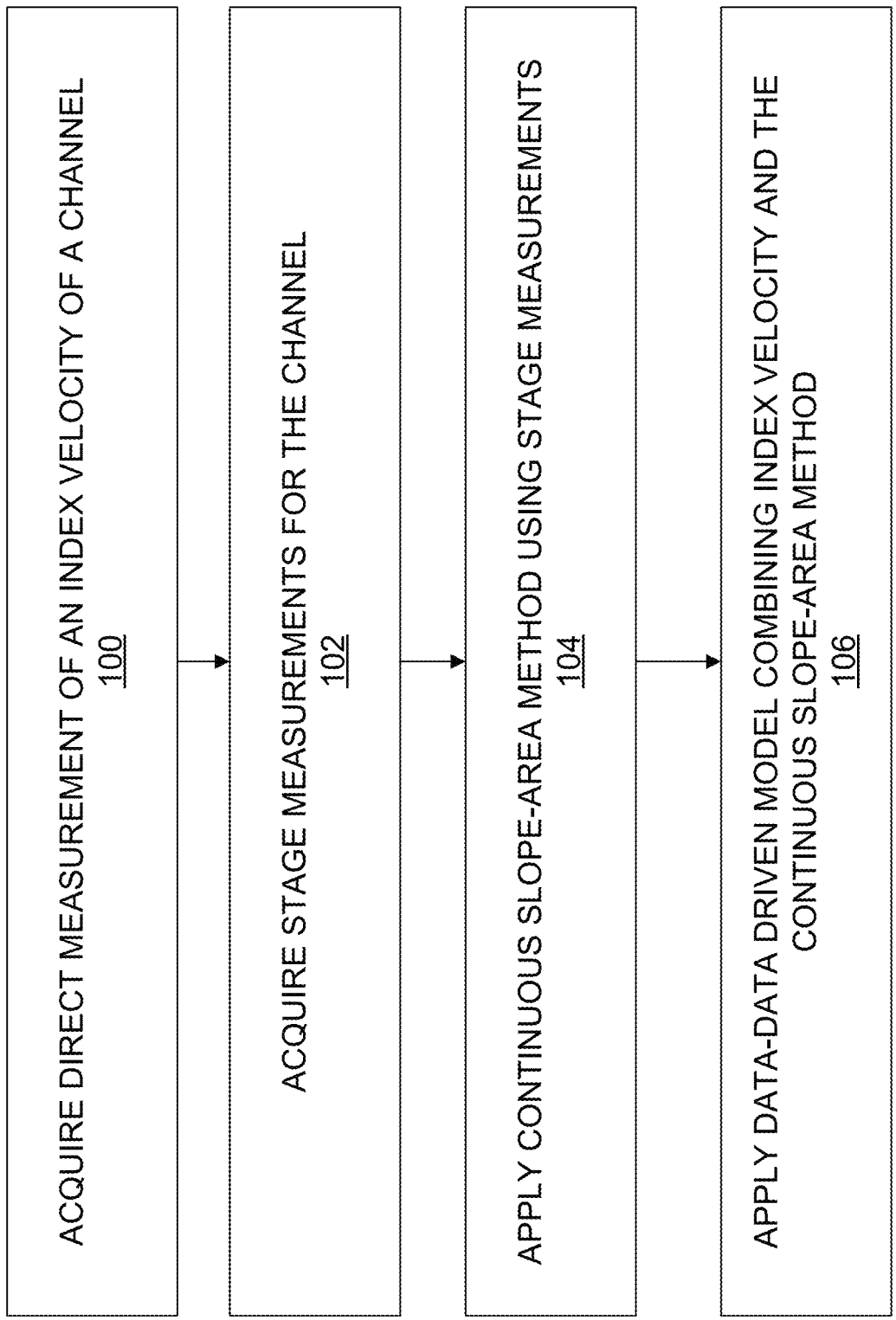
FIG. 7 is a flowchart illustrating one example of a method.

FIG. 7 illustrates one example of a method. In step 100, direct measurement of an index velocity of a channel is acquired. In step 102, stage measurements for the channel are also acquired. The stage measurements may be acquired from a first stage sensor and a second stage sensor. The stage sensor may be of any number of appropriate types of sensors. For example, the sensor may provide a continuous air bubble with an integrated pressure sensor, or any number of other types of stage sensors. In step 104, a continuous slope-area method may be applied to the stage measurements. In step 106, a data-driven model may be applied by combining the index velocity and the continuous slope-area method.

Figure 8:
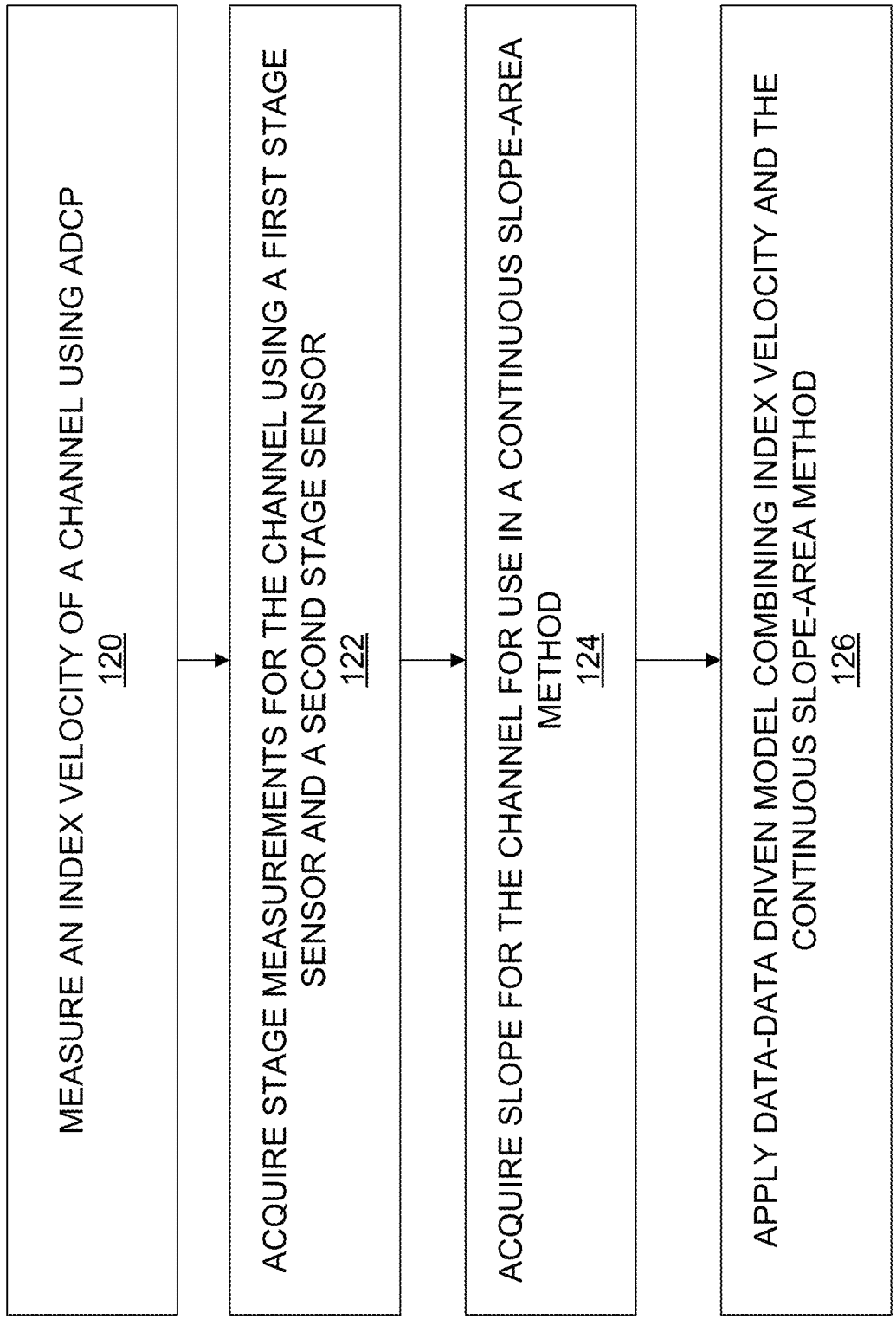
FIG. 8 is a flowchart further illustrating a method.

FIG. 8 illustrates another example of a method. In step 120, an index velocity of a channel is measured using a ADCP measurement device. In step 122, stage measurements are acquired for the channel using a first stage sensor and a second stage sensor. In step 134, slope is acquired for the channel for use in a continuous slope-area method. The channel bed slope may be acquired from a pre-existing digital elevation model (DEM) or from a survey or other direct measurement such as a LIDAR survey. In step 126, a data driven model is applied which combines index velocity and the continuous slope-area method.

At least some of the methods described herein may be incorporated into software in the form of instructions stored on a non-transitory computer or machine readable medium.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments may be described herein as implementing mathematical methodologies including logic or a number of components, modules, or mechanisms. Modules may constitute either software modules (e.g., code embodied on a machine-readable medium or in a transmission signal) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules. Where the term "processor" is used, it is to be understood that it encompasses one or more processors whether located together or remote from one other.

Similarly, the methods described herein may be at least partially processor-implemented. For example, at least some of the operations of a method may be performed by one or processors or processor-implemented hardware modules. The performance of certain of the operations may be distributed among the one or more processors, not only residing within a single machine, but deployed across a number of machines. In some example embodiments, the processor or processors may be located in a single location, while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs).)

The performance of certain of the operations may be distributed among the one or more processors, not only residing within a single machine, but deployed across a number of machines. In some example embodiments, the one or more processors or processor-implemented modules may be located in a single geographic location. In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the disclosure. This description should be read to include one or at least one and the singular also includes the plural unless it is obvious that it is meant otherwise.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments described herein are, for example, capable of operation in sequences other than those illustrated or otherwise described herein. Similarly, if a method is described herein as comprising a series of steps, the order of such steps as presented herein is not necessarily the only order in which such steps may be performed, and certain of the stated steps may possibly be omitted and/or certain other steps not described herein may possibly be added to the method.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary.

Reference throughout this specification to "an example" means that a particular feature, structure, or characteristic described in connection with the example is included in at least one embodiment. Thus, appearances of the phrases "in an example" in various places throughout this specification are not necessarily all referring to the same embodiment or example.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function or "step for [perform]ing [a function] . . . ", it is intended that such elements are to be interpreted under 35 U.S.C. 112§ (f). However, for any claims containing elements designated in any other manner, it is intended that such elements are not to be interpreted under 35 U.S.C. § 112(f).

The invention is not to be limited to the particular embodiments described herein. In particular, the invention contemplates numerous variations. The foregoing description has been presented for purposes of illustration and description. It is not intended to be an exhaustive list or limit any of the invention to the precise forms disclosed. It is contemplated that other alternatives or exemplary aspects are considered included in the invention. The description is merely examples of embodiments, processes or methods of the invention. It is understood that any other modifications, substitutions, and/or additions can be made, which are within the intended spirit and scope of the invention.

REFERENCES

The following references are hereby incorporated by reference in their entireties.
1. Altinakar, M. S., Matheu, E. E., & McGrath. M. Z. (2009 Sep. 27-Oct. 1). New generation modeling and decision support tools for studying impacts of dam failures [Paper presentation]. *Proc., Association of State Dam Safety Officials Dam Safety* 2009 Annual Conf.
2. Aria), C., Tucciarelli, T., Dottori, F., Martina, M. L. V. and Todini, E. (2008). Discharge and peak flow estimation using pairs of simultaneous water level measurements, *Proceedings River Flow Conference*, Altinakar, et al. (eds), ISBN 978-605-60136-3-8, 2423-2429.
3. Chen Y C, Yang T M, Hsu N S, Kuo T M (2012) Real-time discharge measurement in tidal streams by an index velocity. Environmental Monitoring and Assessment, 184 (10):6423-6436. https://doi.org/10.1007/s10661-011-2430-y
4. Chow, V. T. (1959). Open channel flow. London: McGraw-Hill, 11(95), 99, 136-140.
5. De Sutter R., Verhoeven R. and Krein, A (2001) Simulation du transport de sédiment pendant des événements de crue: Expériences au laboratoire et sur le terrain.

Hydrological Sciences Journal, 46(4):599-610. https://doi.org/10.1080/02626660109492853
6. Di Baldassarre, G. and Montanari, A. (2009). Uncertainty in river discharge observations: a quantitative analysis, Hydrol. Earth Syst. Sci. Discuss., 6, pp. 39-61.
7. Dottori, F., Martina, L. V. and Todini, E. (2009). A dynamic rating curve approach to indirect discharge measurements, Hydrol. Earth Syst. Sci, 13, pp. 847-863.
8. Dottori, F. and Todini, E. (2010). Reply to Comment on "A dynamic rating curve approach to indirect discharge measurement by Dottori et al (2009) by Koussis (2009), Hydrol. Earth Syst. Sci. 14, pp. 1099-1107, doi:10.5194/hess-14-1099-2010.
9. Henderson, F. M. (1966). Open Channel Flow, Macmillan Company, New York, p. 522.
10. Fenton, J. D. (2018), On the generation of stream rating curves, Journal of Hydrology 564, 748-757.
11. Fenton, J. D. and Keller, R. J. (2001). The calculation of streamflow from measurement of stage, Technical Report, Cooperative Research Centre for Catchment Hydrology and Centre for Environmental Applied Hydrology, Civil & Environmental Eng., University of Melbourne, Australia.
12. Ferrick, M. G. (1985). Analysis of river wave types, Water Resources Research, 21(2), 209-220.
13. Graf, W. H. and Qu, Z. (2004). Flood hydrographs in open channels," Proceedings of the Institute of Civil Engineers Water Management (157), pp. 45-52.
14. Holmes, R. R., (2016). River rating complexity, Proceedings River Flow Conference, St. Louis, MO, Taylor & Francis Group, ISBN 978-1-138-02913-2
15. Jain, S. and Lall, U. (2000). Magnitude and timing of annual maximum floods: trends and large-scale climatic associations for the Blacksmith Fork River, Utah, Water Resources Research, 36(12).
16. Julien, P. Y. (2002). River mechanics, Cambridge University Press, Cambridge, UK.
17. Levesque, V. A., and Oberg, K. A. (2012). Computing discharge using the index velocity method: U.S.G.S. Survey Techniques and Methods 3-A23, 148 p. http://pubs.usgs.gov/tm/3a23
18. Le Coz J., Pierrefeu, G., and Paquier, A. (2008) Evaluation of river discharges monitored by a fixed side-looking Doppler profiler. Water Resources Research, 46(4)https://doi.org/10.1029/2008WR006967
19. Khan, M. R., Gourley, J. J., Duarte, J. A., Vergara, A., Wasielewski, D., Ayral, P-A. and Fulton, J. W. (2021). Uncertainty in remote sensing of streams using noncontact radars, Journal of Hydrology, 603 (Part A), https://doi.org/10.1016/j.jhydrol.2021.126809
20. Knight, D. W. (2006). River flood hydraulics: calibration issues in one-dimensional flood routing models. In: Knight & Shamseldin (eds), Ch 18, River basin modelling for flood risk mitigation, Taylor & Francis, Chichester, 335-385
21. Morlock, S. E., Nguyen, H. T. and Ross, J. (2002). Feasibility of Acoustics Doppler Velocity meters for the production of discharge records from U.S. Geological Survey Stream-flow-Gaging Stations, U.S.G.S. Water-resources Investigations Report, Indianapolis, IN.
22. Mrokowska M M, Rowinski P M (2019) Impact of unsteady flow events on bedload transport: A review of laboratory experiments. Water (Switzerland), 11(5):907. https://doi.org/10.3390/w11050907
23. Muste, M., Kim, D. and Merwade, V. (2012). Modern digital instruments and techniques for hydrodynamic and morphologic characterization of streams, Ch 24, Gravel Bed Rivers 7: Gravel-bed rivers: processes, tools, environments, Church et al. (eds), John Wiley & Sons, LTD., pp. 315-342.
24. Muste, M., Bacotiu, C. and Thomas, D. (2019). Evaluation of the slope-area method for continuous streamflow monitoring, Proceedings IAHR World Congress, Sep. 1-6, 2019, Panama City, Panama.
25. Muste, M. and Kim, D. (2020). Augmenting the operational capabilities of SonTek/YSI streamflow measurement probes, Sontek/YSI-IIHR Collaborative Research Report, Iowa City, IA (available at: https://info.xylem.com/rs/240-UTB-146/images/augmenting-capabilities-sontek-probe.pdf).
26. Muste, M., Kim, D. and Kim, K. (2022). A flood-crest forecast prototype for river floods using only in-stream measurements, Communications Earth & Environment (accepted).
27. Oberg, K. and Mueller, D. S. (2007). Validation of streamflow measurements made with Acoustic Doppler Current Profilers, J. Hydraul. Eng.-ASCE, 133(12), pp. 1421-1432.
28. Prowse, C. W. (1984). Some thoughts on lag and hysteresis, Royal Geographical Society, 16(1), 17-23.
29. Rantz, S. E. and others, (1982a). Measurement and computation of streamflow: Volume 2. Computation of Discharge, US Geological Survey Water Supply Paper 2175, US Government Printing Office, Washington, DC.
30. Rantz, S. E. and others, (1982b). Measurement and computation of streamflow: Volume 1. Measurement of Stage and Discharge, US Geological Survey Water Supply Paper 2175, US Government Printing Office, Washington, DC.
31. Rijn LC van (1986) Mathematical Modeling of Suspended Sediment in Nonuniform Flows. Journal of Hydraulic Engineering, 112(6):433-455. https://doi.org/10.1061/(asce)0733-9429(1986)112:6(433)
32. Schmidt, A. R. (2002). Analysis of stage-discharge relations for open channel flows and their associated uncertainties, Ph.D. Thesis, U of Illinois at Urbana-Champaign, Champaign, IL
33. Sriwongsitanon N, Ball J E, Cordery I (1998) Etude de la relation entre la vitesse d'onde de crue et les paramètres des modèles d'acheminement du ruissellement. Hydrological Sciences Journal, 43(2):197-213. https://doi.org/10.1080/02626669809492118
34. USGS (1994). A history of the Water Resources Branch of the United States Geological Survey. Volume I, From predecessor surveys to Jun. 30, 1919, R. Follansbee, U.S. Geological Survey, Denver, Co.
35. WMO (2010) Manual on Stream Gauging, Vol. I: Fieldwork. World Meteorological Organization (WMO), Geneva, Switzerland.
36. Yen, B. C. and Gonzalez-Castro, J. A., (2000). Open-channel capacity determination using hydraulic performance graph. J. Hydraul. Eng. 126 (2), 112-122.

What is claimed is:

1. A method for estimating stream flow data of a channel, the method comprising steps of:
acquiring direct measurement of an index velocity of the channel;
acquiring stage measurements for the channel for use in determining slope of a free surface; and
applying a data-driven model combining the index velocity and a continuous slope-area method which uses the slope of the free surface to estimate stream flow data of the channel without using conventional rating curves.

2. The method of claim 1 wherein the acquiring the direct measurement of the index velocity of the channel is performed using a Horizontal or Vertical positioned Acoustic Doppler Current Profiler (ADCP).

3. The method of claim 1 wherein the acquiring the stage measurements is performed using a first stage sensor and a second stage sensor.

4. The method of claim 1 further comprising acquiring a channel bed slope for use in the continuous slope-area method.

5. The method of claim 4 wherein the channel bed slope is determined from a digital elevation model.

6. The method of claim 4 wherein the channel bed slope used in the continuous slope-area method is determined using LIDAR.

7. The method of claim 1 wherein the stream flow data of the channel comprises a pulse.

8. The method of claim 7 wherein the pulse is associated with a storm.

9. The method of claim 1 wherein the stream flow data is determined in real-time.

10. The method of claim 1 wherein the stream flow data of the channel comprises a plurality of pulses.

11. The method of claim 1 wherein the data-driven model applies canonical open-channel flow equations.

12. A system for estimating stream flow data of a channel, the system comprising:
 a measurement device for measuring index velocity of the channel;
 a first stage sensor and a second stage sensor for acquiring stage measurements for the channel for use in determining slope of a free surface; and
 a computing device configured to receive as input index velocity of the channel and the stage measurements for the channel and to apply a data-driven model combining the index velocity and a continuous slope-area method which uses the slope of the free surface to output estimated stream flow data of the channel.

13. The system of claim 12 wherein the measurement device is a Horizontal or Vertical positioned Acoustic Doppler Current Profiler (ADCP).

14. The system of claim 12 wherein a channel bed slope is used in the continuous slope-area method.

15. The system of claim 14 wherein the channel bed slope is determined from a digital elevation model.

16. The system of claim 14 wherein the channel bed slope is determined by LIDAR.

17. The system of claim 12 further comprising a forecasting model stored on a machine readable medium configured for receiving as input the estimated stream flow data of the channel.

18. The system of claim 12 wherein the data-driven model applies canonical open-channel flow equations.

19. A method for estimating stream flow data of a channel, the method comprising steps of:
 measuring an index velocity of the channel using a Horizontal or Vertical Acoustic Doppler Current Profiler (ADCP);
 acquiring stage measurements for the channel using a first stage sensor and a second stage sensor;
 determining a free slope for the channel from the stage measurements for use in a continuous slope-area method;
 obtaining a channel bed slope for use in the continuous slope-area method; and
 applying a data-driven model combining the index velocity and the continuous slope-area method to estimate stream flow data of the channel without using conventional rating curves.

20. The method of claim 19 further comprising communicating the stream flow data to a forecasting model.

* * * * *